Dec. 25, 1962  O. E. JAKEL  3,070,409
ELECTRICAL MOTORS
Filed Jan. 9, 1961  2 Sheets-Sheet 1

INVENTOR.
OTTO E. JAKEL
BY
ATTY.

Dec. 25, 1962
O. E. JAKEL
3,070,409
ELECTRICAL MOTORS
Filed Jan. 9, 1961
2 Sheets-Sheet 2
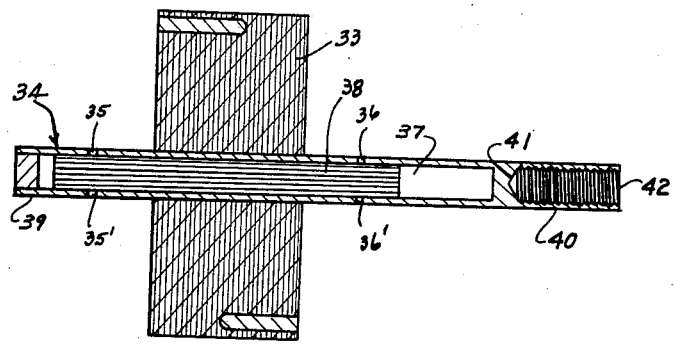
FIG. 4
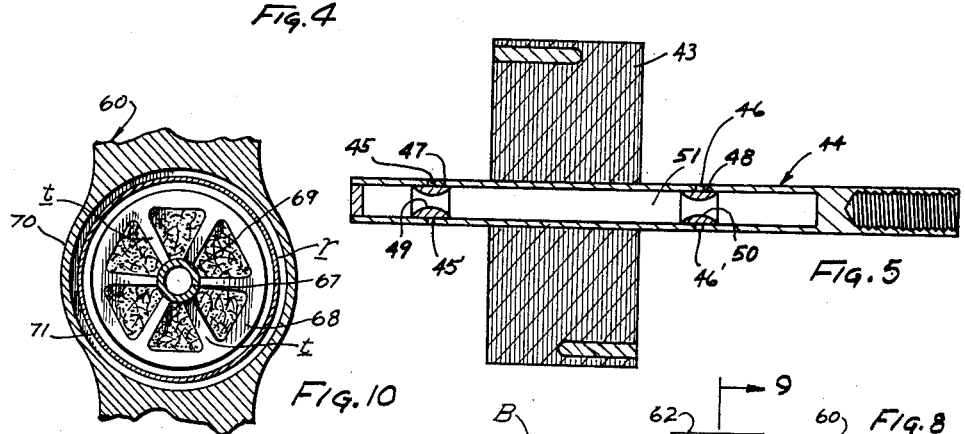
FIG. 5
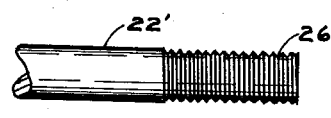
FIG. 6
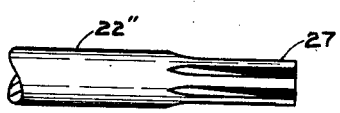
FIG. 7
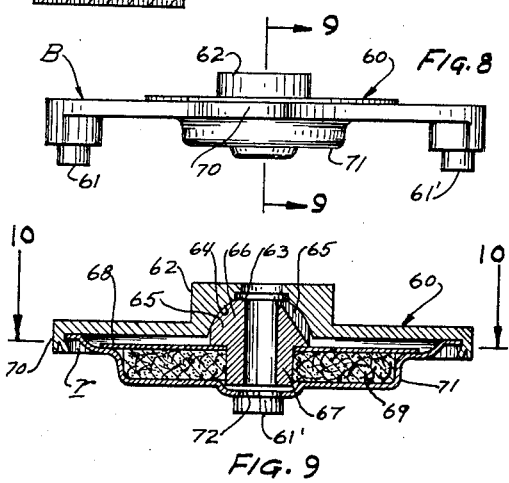
FIG. 10
FIG. 8
FIG. 9
INVENTOR.
OTTO E. JAKEL
BY
ATTY 3,070,409
ELECTRICAL MOTORS
Otto E. Jakel, Highland, Ill., assignor to Jakel Mfg. Co., Highland, Ill., a corporation of Illinois
Filed Jan. 9, 1961, Ser. No. 81,580
10 Claims. (Cl. 308—122)

This invention relates in general to certain new and useful improvements in electrical motors and, more particularly, to so-called "permanently" lubricated electrical motors.

One of the principal problems affecting the life of an electrical motor is the lubrication of the rotor shaft and the bearings in which such shaft runs. In most electrical motors and particularly those of the small or fractional horsepower type, space is at a premium and the lubrication systems provided for the bearings are quite ineffective for sustained operation. In fact, it is conventional practice to drill a small radial oil passage into each bearing so that a drop or two of oil can be periodically applied to the bearing surfaces. When the motor is new and the running tolerance between the shaft and bearing are small, this method of lubrication is reasonably satisfactory although it has the inherent disadvantage of requiring periodic attention. As the shaft wears slightly the lubrication problem becomes increasingly acute because the oil deposited in the oil-holes will quickly flow out of the bearing and be lost. Consequently, as motors become older it is necessary to oil them at progressively shorter intervals. For small motors which are usually mounted in inaccessible locations, this becomes a serious difficulty.

Closely related to this problem of lubrication is the problem of temperature gradient. All electric motors evidence a gradual temperature rise during use and will ultimately reach some temperature at which the heat loss is approximately equal to the input of heat electrically generated in the windings and frictionally generated by the moving parts. Once this temperature equilibrium is reached the motor will normally continue to operate at the temperature thus reached. Of course, changes in air circulation or load factors may change this temperature but, generally speaking, all electric motors operate at a temperature-level substantially above ambient temperature. As a result, lubricants conventionally deposited in the bearings will have increasingly lower viscosity as the temperature rises with the result that the lubricant will flow more freely away from the bearing surfaces. Actually, as the lubricant becomes thin and the lubricant film becomes attenuated, the additional friction produces added heat which, in turn, further attenuates the lubricant film and finally the bearings burn out.

It is, therefore, a primary object of the present invention to provide an electric motor having a self-lubricating shaft capable of continuous operation over extended periods of time without maintenance or servicing.

It is another object of the present invention to provide an electric motor of the type stated which is highly efficient in operation having a minimum of power loss due to bearing-friction.

It is also an object of the present invention to provide an electric motor of the type stated which can be manufactured economically and with a high degree of precision on a mass-production basis.

With the above and other objects in view, my invention resides in the novel features of form, construction, arrangement, and combination of parts presently described and pointed out in the claims.

In the accompanying drawings (two sheets)—

FIG. 4 is a longitudinal sectional view of a modified form of shaft-rotor assembly constructed in accordance with and embodying the present invention;

FIG. 5 is a longitudinal sectional view of another modified form of shaft-rotor assembly constructed in accordance with and embodying the present invention;

FIGS. 6 and 7 are fragmentary elevational views of modified forms of shaft-endings which can be employed in accordance with the present invention;

FIG. 8 is a side elevational view of a modified form of bearing bracket constructed in accordance with and embodying the present invention;

FIG. 9 is a fragmentary sectional view taken along line 9—9 of FIG. 8; and

FIG. 10 is a transverse sectional view taken along line 10—10 of FIG. 9.

Figure 1:
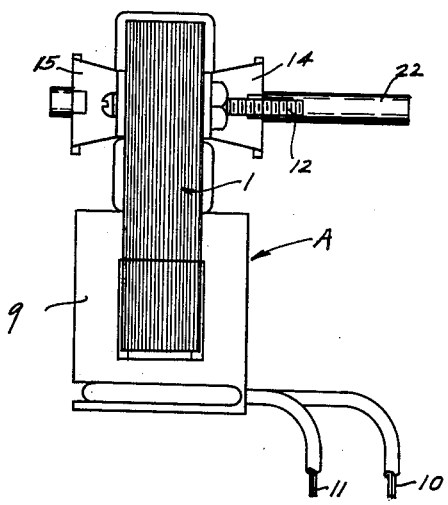
FIG. 1 is a side elevational view of an electric motor constructed in accordance with and embodying the present invention.
Figure 2:
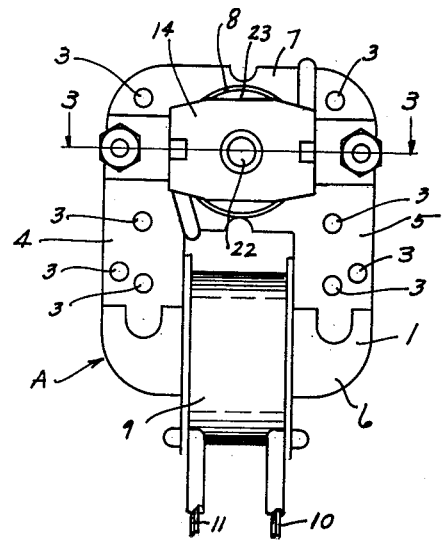
FIG. 2 is a front elevational view of the electric motor shown in FIG. 1.

Referring now in more detail and by reference characters to the drawings, which illustrate practical embodiments of the present invention, A designates an electrical motor of the fractional horsepower, single-phase shaded pole type comprising a stator 1 formed of a plurality of stacked laminations 2 permanently held in assembled relation by a plurality of rivets 3. The stator 1 includes side-legs 4, 5, transversely connected at one end by a transverse leg 6 and at the other end by a bridge portion 7 having a cylindrical bore 8 of relatively large diameter. Conventionally mounted upon the transverse leg is a field coil 9 provided with the usual insulated wire leads 10, 11, for ultimate connection to a suitable source of electrical power, the latter not being shown.

Mounted upon opposite lateral faces of the stator 1 by means of bolts 12, 13, and extending diametrally across opposite ends of the bore 8, are two substantially identical frame brackets 14, 15, which are provided with self-aligning bearings 16, 17, formed preferably of oil impregnated sintered bronze and surrounded by felt washers 18, 19. The bearings 16, 17, are held in coaxial alignment with the bore 8 by means of cup-shaped washers 20, 21, respectively, the latter being preferably spot-welded as at s to the inner faces of the brackets 14, 15, as the bearings 16, 17, are assembled therein.

Journaled within and extending axially through the bearings 16, 17, is a shaft 22 which is rigidly set into a rotor 23 of the squirrel cage type. The outside diametral size of the rotor is slightly smaller than the cylindrical bore 8 so as to rotate freely therein. The shaft 22 is provided from one end with a coaxial drill-hole 24 of relatively large diametral size so that the drill hole 24 will have maximum volumetric size without unduly reducing the strength of the shaft 22. At its other end, the shaft 22 is provided with a short internally threaded drill hole 25 adapted for connection with any mechanical element (not shown) which is to be driven by the motor A. As shown in FIGURES 6 and 7, the motor A may be constructed with modified forms of shafts 22' and 22" respectively, which differ only from the shaft 22 in being provided with an externally threaded coupling-end 26, or a splined coupling end 27.

The drill-hole 24 is provided, in the region of the bearings 16, 17, with diametrally opposed pin-holes 28, 28' and 29, 29', that is to say, radially drilled holes of extremely small diametral size and press-fitted into the drill-hole 24 and fixedly lodged therein, across the pairs of drill-holes 28, 28' and 29, 29', preferably in symmetrical relation, are two cylindrical plugs 30, 31, which are formed of a structurally strong porous material, such as a highly porous sintered metal carbide, pumice-stone or the like. The material itself is not critical so far as its chemical constituency is concerned, but it is essential that the material have a rigid or semi-rigid structure with a large number of small interstices in the nature of capillaries. After the plug 30 is installed the drill-hole is charged with a lubricant of suitable viscosity. It is preferable to employ a silicone oil of which a number are commercially available, inasmuch as such oils have a relatively level temperature-viscosity curve. Then the second plug 31 is set in place as shown in FIG. 3 and finally a closure plug 32 is pressed snugly into the outer end of the drill-hole 24 and brazed or otherwise rigidly secured in place.

Figure 3:
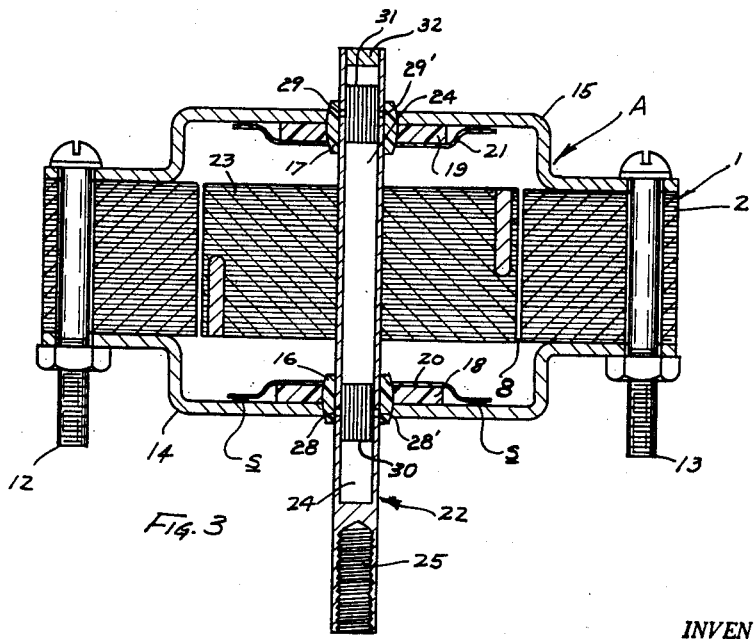
FIG. 3 is a transverse sectional view taken along line 3—3 of FIG. 2.

When the rotor 23 and its shaft 22 are assembled within the stator 1, as shown in FIG. 3, the oil within the drill-hole 24 will be drawn by capillarity through the plugs 30, 31, and delivered in very small quantity to the drill-holes 28, 28′, 29, 29′, so as to create a thin lubricant film between the bearings 16, 17, and the outer surface of the shaft 22. Upon energization of the motor A, the rotor 23 will rotate in the usual manner and centrifugal forces will cause the oil to continue to flow through the plugs 30, 31, to, and out of, the drill holes 28, 28′, 29, 29′. Since the capillaries in the plugs 30, 31, are very fine, the oil will flow very slowly and in only such quantity as will keep the bearings 16, 17, efficiently lubricated for a number of years of continuous running.

It is also possible to provide a modified form of rotor 33 which is substantially identical in all respects to the previously described rotor 23 having a tubular shaft 34 with pairs of lubricant-dispensing drill-holes 35, 35′ and 36, 36′. The interior chamber 37 within the shaft 34, however, is filled with a single continuous rod-like element 38 formed preferably of highly porous felt or similar material saturated with lubricating oil. On end 39 of the shaft 34 is sealed with a closure-plug 38 and the other end 40 of the shaft 34 is provided with a drill-hole 41 having internal threads 42 for coupling to any suitable mechanical element which is to be driven by the rotor. When the rotor 33 is rotated the oil in the rod-like element 38 will be propelled outwardly to the bearing surfaces in a controlled flow as previously described.

It is also possible to provide a further modified form of rotor 43 which is substantially similar in all respects to the previously described rotor 23 having a tubular shaft 44 provided with lubricant-dispensing drill-holes 45, 45′, and 46, 46′, which are internally covered with tubular plugs 47, 48, formed of porous material similar to that used for the plugs 30, 31. The internal passages 49, 50, of the plugs 47, 48, are centrally constricted as shown in FIG. 5, and thereby provide close control for oil flow.

The interior chamber 51 is filled with a suitable lubricating oil and the open end of the tubular shaft 44 is sealed with a closure plug 52. The shaft 44 is provided at its other end with an internally threaded drill-hole 53 which serves as a coupling member, as previously described.

It is also possible to provide a modified form of bearing bracket B, as shown in FIG. 8, which comprises a die-cast frame-plate 60 integrally provided at its opposite ends with depending tubular bosses 61, 61′, by which the bracket B may be assembled with an electric motor such as the previously described electric motor A. Also integrally formed with the frame-plate 60 and projecting centrally upwardly therefrom is a collar-boss 62, which is provided with a central shaft-clearing bore 63. On its under or interior face the collar-boss 62 is formed with a concave recess 64 of somewhat spherical contour for receiving a self-aligning bearing 65 which is formed preferably of oil impregnated sintered bronze and integrally includes a bulbous top portion 66 adapted for self-aligning fit within the recess 64. At its opposite end, the bearing 65 is integrally provided with a cylindrical sleeve-portion 67 which extends centrally through a flat spring-steel retention washer 68 and a relatively thick felt disk 69, the latter having an outside diametral size somewhat smaller than the outside diametral size of the retention washer 68 and also being punched out centrally to a diametral size which is slightly smaller than the outside diametral size of the sleeve-portion 67 of the bearing 65 so as to fit snugly and more or less retentively thereon. The bulbous portion 66 of the bearing is formed upon its outer surface with an axially extending slot which opens at its upper end to the bore 63 of the collar-boss 62.

On its under face, the frame-plate 60 is provided with a depending concentric flange 70 which, in effect, forms a recess r of sufficient depth to receive the sub-assembly consisting of the bearing 65, the retention washer 68, and the felt disk 69. Provided for disposition within the flange 70 is a stamped metal closure element 71 which is dished downwardly and is centrally provided with a shaft-clearance aperture 72. On its outer periphery, the closure-element 71 is shaped to fit snugly within the flange 70 to hold the bearing 65 and associated parts snugly within the recess 64 so that it is held in self-aligning position between the tines t of the washer 68 and the spherical contoured surface of the recess 64. It will, of course, be evident that the aperture 72 in the closure-element 71 is substantially larger than the bore within the bearing 65 so as to avoid interference with the self-adjusting function of the bearing 65.

This bearing bracket B, coupled with the previously described hollow shaft construction, creates a dual lubrication system since the bearing 65 is surrounded by a felt disk 69 which serves as a form of wicking and will return oil to the bearing in the event that lubricant is dissipated from the porous sintered bronze from which the bearing 65 is fabricated.

It should be understood that changes and modifications in the form, construction, arrangement, and combination of the several parts of the electrical motors may be made and substituted for those herein shown and described without departing from the nature and principle of my invention.

Having thus described my invention, what I claim and desire to secure by Letters Patent is:

1. In an electric motor or similar device having a stationary element and a rapidly rotating element operatively mounted between bearings supported in fixed relation to the stationary element; a self-lubricating shaft rotatably disposed within said bearings and having an internal axial reservoir, a fluid lubricant within the reservoir, means carried by the shaft for distributing said lubricant from the reservoir to the operatively contacting surfaces between the shaft and the bearings, said means including outwardly extending lubricant passages communicating at one end with the reservoir and at the other end with the operative surfaces of the bearings, and a relatively large porous plug-like element mounted in said reservoir and disposed over said lubricant passages for metering centrifugal flow of fluid lubricant to the bearings.

2. In an electric motor or similar device having a stationary element and a rapidly rotating element operatively mounted between bearings supported in fixed relation to the stationary element; a self-lubricating shaft rotatably disposed within said bearings and provided with an axial bore which forms an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end with the reservoir and at the other end with the operative surfaces of the bearings, and a relatively large porous plug-like element mounted in said reservoir and disposed over said lubricant passages for metering centrifugal flow of fluid lubricant to the bearings.

3. In an electric motor or similar device having a stationary element and a rapidly rotating element operatively mounted between bearings supported in fixed relation to the stationary element; a self-lubricating shaft rotatably disposed within said bearings and provided with a closed-ended axial bore which forms an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end with the reservoir and at the other end with the operative surfaces of the bearings, and a relatively large porous plug-like element mounted in said reservoir and disposed over said lubricant passages for metering centrifugal flow of fluid lubricant to the bearings.

4. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end with the reservoir and at the other end with the operative surfaces of the bearings, and relatively large porous plug-like elements mounted in said reservoir and disposed over said lubricant passages, said plug-like elements having a diametral size substantially equal to the internal diametral size of said reservoir so as to be fixedly lodged therein for metering centrifugal flow of fluid lubricant to the bearings.

5. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, means carried by the shaft for distributing said lubricant from the reservoir to the operatively contacting surfaces between the shaft and the bearings, said means including radially extending lubricant passages communicating at one end with the reservoir and at the other end with the operative surfaces of the bearings, and relatively large porous plug-like elements mounted in said reservoir and disposed over said lubricant passages, said plug-like elements having a diametral size substantially equal to the internal diametral size of said reservoir so as to be fixedly lodged therein for metering centrifugal flow of fluid lubricant to the bearings.

6. In an electric motor or similar device having a stationary element and a rapidly rotating element operatively mounted between bearings supported in fixed relation to the stationary element; a self-lubricating shaft rotatably disposed within said bearings and provided with an axial bore which forms an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end with the bore and at the other end with the operative surfaces of the bearings, and relatively large porous plug-like elements mounted in said reservoir and disposed over said lubricant passages, said plug-like elements having a diametral size substantially equal to the internal diametral size of said reservoir so as to be fixedly lodged therein for metering centrifugal flow of fluid lubricant to the bearings.

7. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end and at the other end with the operative surfaces of the bearings, and a single continuous rod-like felt packing element fitted within said reservoir and disposed over said passageways for restricting the quantity of lubricant that flows through said passageways.

8. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, means carried by the shaft for distributing said lubricant from the reservoir to the operatively contacting surfaces between the shaft and the bearings, said means including outwardly extending lubricant passages communicating at one end with the reservoir and at the other end with the operative surfaces of the bearings, and a single continuous rod-like porous packing element fitted within said reservoir and disposed over said passageways for restricting the quantity of lubricant that flows through said passageways.

9. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, said shaft being formed with radially extending passageways which communicate with the operative surfaces of the bearings and with the reservoir, said radial passageways having a smaller diametral size than said reservoir, a pair of relatively porous plug-like elements mounted within said reservoir, and each being disposed over one of said radial passageways, said plug-like elements having a diametral size substantially equal to the internal diametral size of said reservoir so as to be fixedly lodged therein for metering centrifugal flow of fluid lubricant to the bearings.

10. In an electric motor or similar device having a stationary element and a rapidly rotating element operatively mounted between bearings supported in fixed relation to the stationary element; a self-lubricating shaft rotatably disposed within said bearings and having an internal reservoir, a fluid lubricant within the reservoir, said shaft being formed with radially extending passageways which communicate with the operative surfaces of the bearings and with the reservoir, said radial passageways having a smaller diametral size than said reservoir, a pair of relatively porous plug-like elements mounted within said reservoir and each being disposed over one of said radial passageways, said plug-like elements being formed of a semi-rigid material with a large number of small interstices, said plug-like elements having a diametral size substantially equal to the internal diametral size of said reservoir so as to be fixedly lodged therein for metering centrifugal flow of fluid lubricant to the bearings.

References Cited in the file of this patent

UNITED STATES PATENTS

| | | |
|---|---|---|
| 1,991,623 | Onsrud | Feb. 19, 1935 |
| 2,275,538 | Marvin et al. | Mar. 10, 1942 |
| 2,315,917 | Arutunoff | Apr. 6, 1943 |
| 2,501,814 | Gillen | Mar. 28, 1950 |
| 2,516,567 | Hamm | July 25, 1950 |
| 2,668,086 | Marzolf | Feb. 2, 1954 |
| 2,688,102 | Jackson | Aug. 31, 1954 |
| 2,802,704 | Tweedy | Aug. 13, 1957 |
| 2,922,682 | Abel | Jan. 26, 1960 |